(12) United States Patent
Hlava

(10) Patent No.: US 6,614,549 B1
(45) Date of Patent: Sep. 2, 2003

(54) PRINT MODEL THAT ALLOWS DIRECT JOB SUBMISSION TO PHYSICAL PRINTER OBJECTS WHILE PRESERVING JOB DEFAULTING, VALIDATION AND SCHEDULING

(75) Inventor: Alan Hlava, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/277,061

(22) Filed: Mar. 26, 1999

(51) Int. Cl.[7] .............................. G06F 15/00; G06K 1/00
(52) U.S. Cl. ..................... 358/1.15; 358/1.1; 358/1.9; 358/1.16; 358/448
(58) Field of Search ................................ 358/1.15, 1.1, 358/1.9, 1.16, 448

(56) References Cited

U.S. PATENT DOCUMENTS

| | | | |
|---|---|---|---|
| 5,559,933 A | 9/1996 | Boswell ...................... | 395/114 |
| 5,720,015 A | 2/1998 | Martin et al. ............... | 395/114 |
| 5,727,135 A * | 3/1998 | Webb et al. ................ | 358/1.14 |
| 5,761,396 A | 6/1998 | Austin et al. ............... | 395/114 |
| 5,768,583 A | 6/1998 | Orzol et al. ................. | 395/651 |
| 5,819,014 A | 10/1998 | Cyr et al. .................... | 395/114 |
| 5,903,716 A * | 5/1999 | Kimber et al. ............. | 358/1.13 |
| 5,978,560 A * | 11/1999 | Tan et al. .................... | 358/1.15 |
| 6,088,120 A * | 7/2000 | Shibusawa et al. ......... | 358/1.15 |
| 6,373,585 B1 * | 4/2002 | Mastie et al. .............. | 358/1.15 |
| 6,452,692 B1 * | 9/2002 | Yacoub ....................... | 358/1.15 |

FOREIGN PATENT DOCUMENTS

| | | |
|---|---|---|
| EP | 0 738 956 A2 | 10/1996 |
| JP | 9-258930 | 10/1997 |

OTHER PUBLICATIONS

Information Technology—Text And Office Systems–Document Printing Application (DPA), *Part 1: Abstract Service Definition and Procedures*, pp. 1–487; *Part 2: Protocol Specification*, pp. 1–12, ISO/IEC JTC1/ SC18/ WG4 N 3038rev, Jul. 1996.

Abstract for EPO Patent No. EP 0 738 956 A2, 1 page.

Abstract for Japanase Patent No. 9–258930, 1 page.

* cited by examiner

*Primary Examiner*—Edward Coles
*Assistant Examiner*—Ashanti Ghee
(74) *Attorney, Agent, or Firm*—Blakely Sokoloff Taylor Zafman LLP

(57) ABSTRACT

A print model is provided that supports job submission to either physical or logical printer objects while preserving job defaulting, validation, and scheduling. According to one aspect of the present invention physical printers, e.g., objects representing the capabilities of associated output devices, may be the target of print job submissions. When a print job is received at a physical printer, an association is created between the print job and the physical printer. Then, the print job is routed from the physical printer to a predetermined logical printer, e.g., an object representing an abstract set of job and output device capabilities. According to another aspect of the present invention, an improved print server includes multiple physical printer objects that may serve as targets of print job submissions. The physical printer objects each correspond to an associated output device and each include an attribute that identifies a logical printer object, if any, through which print jobs may flow to the physical printer object. Additionally, each physical printer object is configured to create an association between print jobs submitted to the physical printer object and the physical printer object. Furthermore, each physical printer object is configured to transfer the print jobs to the logical printer object identified by the attribute. The print server also includes one or more logical printer objects. The logical printer objects are coupled to the physical printer objects and are configured to schedule the print jobs on the physical printer objects with which the print jobs are associated.

33 Claims, 7 Drawing Sheets

PRINT MODEL THAT ALLOWS DIRECT JOB SUBMISSION TO PHYSICAL PRINTER OBJECTS WHILE PRESERVING JOB DEFAULTING, VALIDATION AND SCHEDULING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to client-server printing environments and printer management software that support both logical and physical printer objects. More particularly, the invention relates to a mechanism that allows physical printers to be the target of print submissions while preserving job defaulting, validation, and scheduling.

2. Description of the Related Art

International Standards Organization (ISO) Document Printing Application (DPA) 10175, July 1996 ("ISO DPA 10175") defines a print model that includes three subtypes of printer objects: logical printer objects, physical printer objects, and logical-and-physical printer objects. Typically, in printer management software the logical printer is used for job defaulting and validation while the physical printer is used to represent the actual output device. FIG. 1 is a simplified block diagram depicting the simplest configuration of objects for driving three non-pooled output devices according to a prior art job submission and processing approach. According to the structure illustrated in this example, for each output device (not shown), the printer management software creates and manages three software objects, e.g., a logical printer, a queue, and a physical printer. In order to receive the full benefits of job and document defaulting, validation, and scheduling, jobs need to be submitted to the logical printers 110, 140, and 170. The logical printers are coupled to corresponding physical printers 130, 160, and 190 by way of queues 120, 150, and 180, respectively. The queues 120, 150, and 180 may perform various scheduling algorithms. For example, jobs may be handled based upon the order submitted, based upon a priority associated with the job, based upon a combination of the order submitted and the priority, or based upon other characteristics of the job. At any rate, when a physical printer becomes available, the job is transferred from the queue 120, 150, or 180 to the corresponding physical printer 130, 160, or 190. The physical printer 130, 160, and 190 typically processes the job using its associated driver (not shown) to create the data stream required by the target output device. The data stream is then communicated to the target output device where it is printed.

While the above print model is extremely powerful and flexible, allowing a very diverse set of printing/queueing configurations, for certain printing environment implementations, this power and flexibility is unneeded and unnecessarily complicates the configuration with lots of objects. It is desirable, therefore, to provide a simplified environment for users who do not yet need all the power and flexibility supplied by this print model.

Because ISO DPA 10175 allows direct job submission to physical printers, one prior attempt at simplification allows physical printers to be the target of job submissions. However, an adverse effect of this approach is the bypassing of critical functionality, e.g., defaulting, validation, and scheduling, provided by the logical printers and queues. Further, while some users can be abstracted from the concept of logical printers, assuming that other users would like to continue to submit jobs to a logical printer, this solution does nothing to actually reduce the number of objects that must be created and maintained for each output device.

Another alternative is to use the logical-and-physical type of printer object defined by ISO DPA 10175. However, this combined type of printer object creates yet another object class and can actually complicate rather than simplify the printing environment for both system administrators and users. In addition, it is unclear where the queues would fit into this model and how scheduling would be performed. Furthermore, if and when the users decide that they want to allow pooling of output devices (e.g., printer pooling), this ISO DPA 10175 solution would probably require a configuration change back to separate logical and physical printer objects.

In view of the foregoing, it is desirable to provide an object model that allows users to have a simple view of the printing environment while preserving the important functions of defaulting, validation, and scheduling. Additionally, it would be advantageous to minimize the need for reconfiguration when pooling is added and/or removed.

BRIEF SUMMARY OF THE INVENTION

A print model is described that supports job submission to either physical or logical printer objects while preserving job defaulting, validation, and scheduling. According to one aspect of the present invention physical printers, e.g., objects representing the capabilities of associated output devices, may be the target of print job submissions. When a print job is received at a physical printer, an association is created between the print job and the physical printer. Then, the print job is routed from the physical printer to a predetermined logical printer, e.g., an object representing an abstract set of job and output device capabilities.

According to another aspect of the present invention, an improved print server includes multiple physical printer objects that may serve as targets of print job submissions. The physical printer objects each correspond to an associated output device and each include an attribute that identifies a logical printer object, if any, through which print jobs may flow to the physical printer object. Additionally, each physical printer object is configured to create an association between print jobs submitted to the physical printer object and the physical printer object. Furthermore, each physical printer object is configured to transfer the print jobs to the logical printer object identified by the attribute. The print server also includes one or more logical printer objects. The logical printer objects are coupled to the physical printer objects and are configured to schedule the print jobs on the physical printer objects with which the print jobs are associated.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
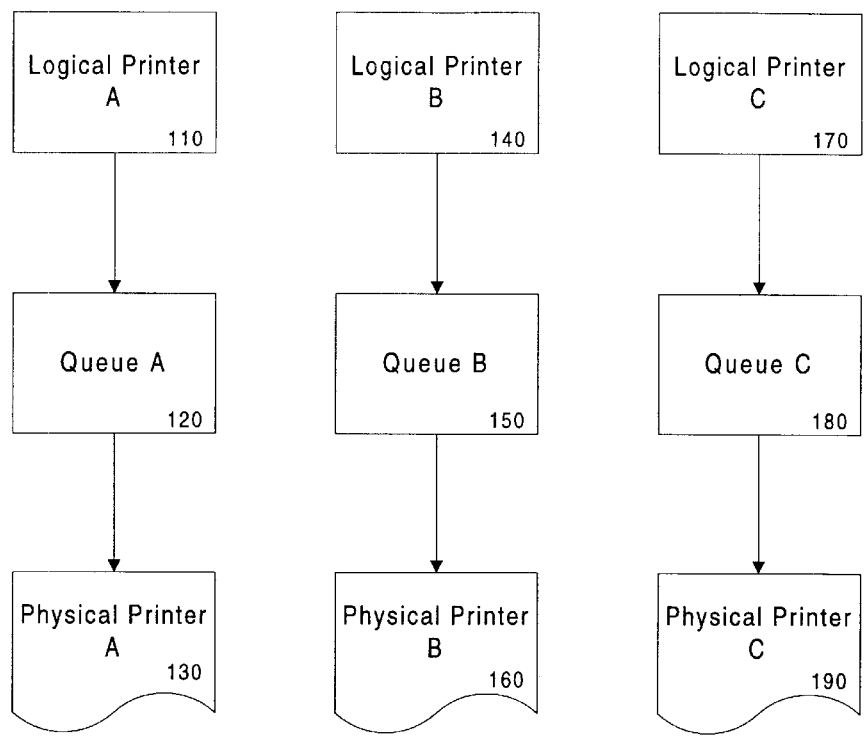
FIG. 1 is a simplified block diagram depicting interaction among logical printer objects, queue objects and physical printer objects according to a prior art job submission and processing approach.

A print model is described that supports job submission to either physical or logical printer objects while preserving job defaulting, validation, and scheduling. Broadly stated, embodiments of the present invention allow a physical printer to accept direct job submissions, e.g., print requests specifying print, fax, and/or other output jobs, without the adverse effects described above. According to one embodiment, physical printers have knowledge of a logical printer through which jobs may flow to the physical printer, and the physical printers are therefore capable of routing print job submissions to the logical printer on behalf of the user. Advantageously, in this manner, users get the benefits of existing, powerful defaulting, validation, and scheduling features without needing to be made aware of the underlying complexities and other types of printer objects that reside in the print server. Additionally, as will be explained in more detail below, by connecting the logical printers and the physical printers of a printing environment through a single queue for scheduling, many other benefits can be achieved. For example, the system administrator's duties can be simplified since fewer printer objects need to be created and managed. Also, jobs can be viewed and managed though the single queue. Furthermore, by simply changing the submission target, this structure provides printer pooling without necessitating reconfiguration of the printer objects.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

For convenience, embodiments of the present invention will be described with reference to printer objects using the terminology of ISO DPA 10175, which is hereby incorporated by reference. However, logical printers and physical printers are not limited the definitions given to them by ISO DPA 10175. Rather, for purposes of this specification, a logical printer may be thought of as a potential target of job submissions that represents an abstract set of job and output device capabilities, such as the types of document formats supported and the types of media supported. In contrast, a physical printer refers to a software representation of an actual hardware output device. That is, a physical printer is an object that represents the capabilities of a corresponding output device and handles communication with the output device.

In addition, while embodiments of the present invention are described with reference to hard copy printers, e.g., laser printers, ink-jet printers and impact printers, the present invention is equally applicable to other types of output devices as well, such as copiers, plotters, facsimile machines, microfilm/microfiche generators, and display devices. Therefore, as used herein, the act of printing may include any form of output which transforms an electronically encoded and stored form of a document into a visible representation.

An Exemplary Printing Environment

Figure 2:
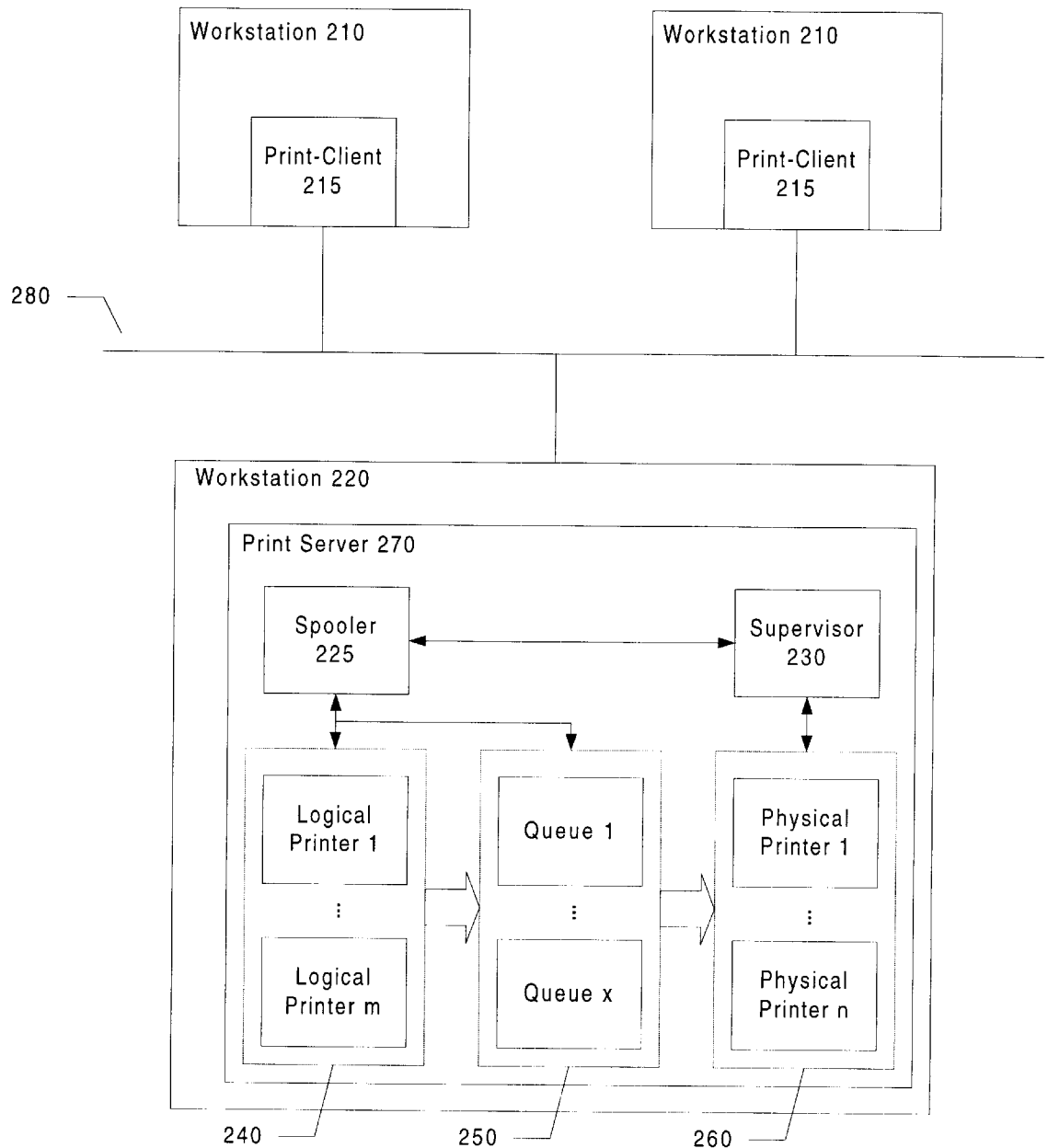
FIG. 2 is a block diagram illustrating a printing environment in which one embodiment of the present invention may be employed.

FIG. 2 is a block diagram illustrating a network printing system in which one embodiment of the present invention may be employed. According to the embodiment depicted, a printing environment includes one or more workstations 210 and 220 coupled in communication by way of a network 280, such as a local area network (LAN). In the present example, workstation 220 receives print requests (e.g., print, fax, and/or other output jobs) over the network 280 from workstations 210 and causes the jobs to be output on the appropriate hardware output device.

In the embodiment depicted, workstations 210 include print-clients 215 and workstation 220 includes a print server 270. However, in alternative embodiments, the print-clients 215 and the print server 270 may be co-located on workstation 220. In any event, the print server 270 is the component of the printing system that accepts print requests from the print-clients 215, performs the requested operation, and reports status back to the print-clients 215.

The print server 270 represents various printer management software processes and/or objects running on one or more processors of the workstation 220. In one embodiment, the print server 270 may comprise a current or future release of IBM® InfoPrint® Manager, Print Services Facility (PSF), e.g., PSF/MVS or PSF/400, IBM Printing Systems Manager (PSM), or other commercially available print server (IBM and INFOPRINT are trademarks or registered trademarks of International Business Machines Corporation, the assignee of the present invention).

In this example, the software architecture of the print server 270 includes the following components: a spooler process 225, one or more supervisor processes 230, one or more logical printers 240, one or more queues 250, and one or more physical printers 260. In one embodiment, the spooler process 225 and the supervisor processes 230 manage and control the logical printers 240, queues 250, and physical printers 260. For example, the spooler process 225 may control the logical printers 240 and the queues 250, apply specified defaults to jobs, validate that output devices on the network 280 can print the jobs, and schedule jobs from the queues 250 to the physical printers 260. Among other things, the supervisor processes 230 may receive jobs from the spooler process 225, direct jobs to the appropriate physical printer 260, process the jobs with device drivers associated with the physical printers 260, report errors to the spooler process 225 and the print client 215, and maintain and report job status.

As described above, the logical printers 240 are software objects that represent the abstract set of job and output device capabilities including, for example, the types of document formats supported and the types of media supported. The logical printers 240 may perform the functions of document and job validation at the direction of the spooler process 225. The Queues 250 schedule jobs on the physical printers 260. While in this example, m logical printers are shown as sending jobs to x queues, in alternative embodiments, one or more logical printers can send jobs to a single queue. In addition, each queue may be associated with one or more physical printers. The physical printers 260 are software objects that may be defined to represent corresponding hardware output devices. For example, attributes of the physical printers 260 may be configured to reflect features, functions and capabilities of one or more associated hardware output devices such as fonts supported, media supported, etc. Although for clarity, processes and object representations have been depicted separately in this example, in alternative embodiments the functionality of the spooler process 225 and the supervisor processes 230 may be distributed other than as illustrated. For example, more or less processes may perform the management and control functions or the functions may be incorporated into the logical printers 240, queues 250, and the physical printers 260. Therefore, it should be appreciated that the software architecture of the print server 270 may include more or less processes and/or objects than illustrated. Additionally, the printer objects 240, 250, and 260 may reside on the same computer system or be distributed across several different computer systems on the network 280. If the printer objects 240, 250, and 260 are physically separated, communication links may be established and maintained among them via a TCP/IP, sockets-based interface, for example.

In the past, in order to receive the benefit of defaulting, validation, and scheduling, jobs had to be submitted to logical printers 240. As will be described further below, a novel feature of the present invention allows users to take advantage of existing defaulting, validation, and scheduling even when the users submit jobs directly to the physical printers 260. According to another novel feature, pooling of hardware output devices may be added and/or removed without the burden of reconfiguring the printer management software.

An Exemplary Computer Architecture

Figure 3:
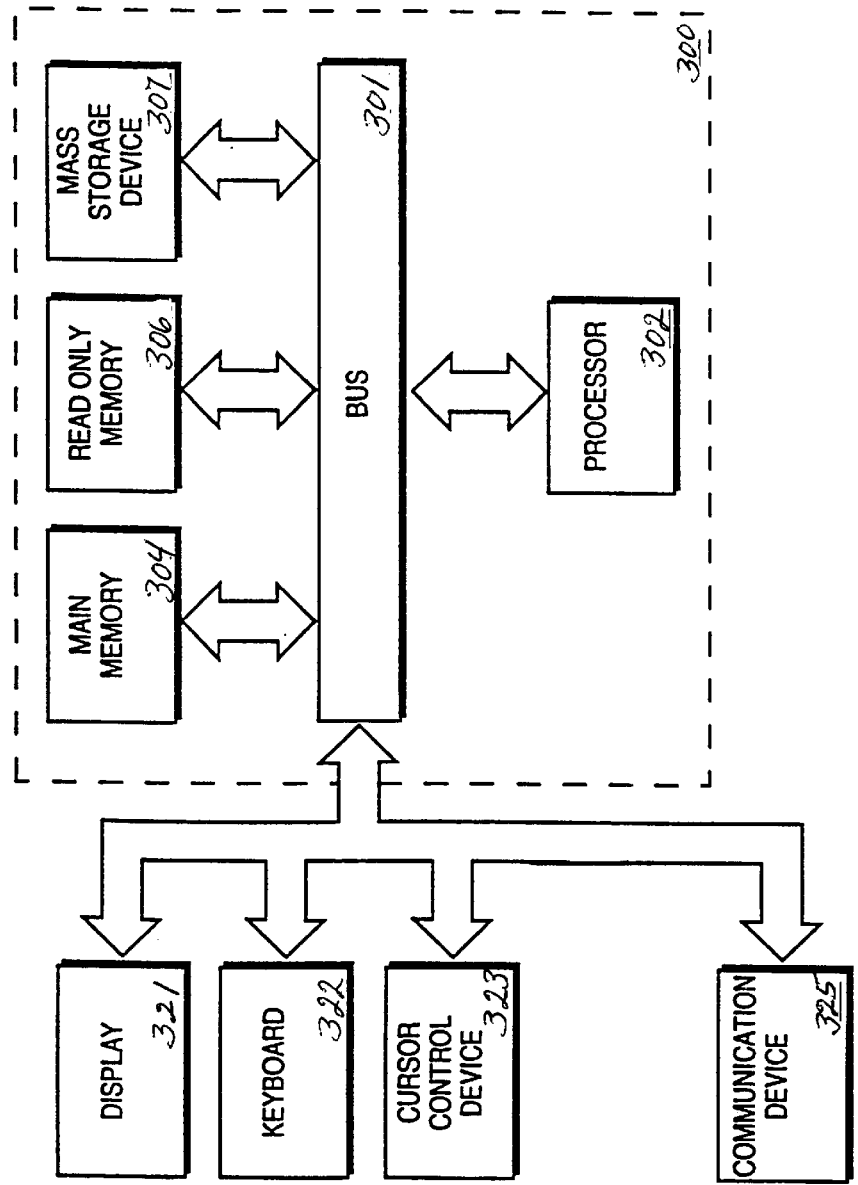
FIG. 3 is an example of a typical computer system upon which one embodiment of the present invention or components thereof may be implemented.

Having briefly described an exemplary network printing system in which various features of the present invention may be employed, an exemplary machine in the form of a computer system 300 representing an exemplary workstation, host, or server in which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to an end user. For example, graphical and/or textual depictions/indications of job and device status, previews of print jobs, and other data types and information may be presented to the end user on the display device 321. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301. Depending upon the particular printing environment implementation, the communication device 325 may include a modem, a network interface card, or other well known interface devices, such as those used for coupling to Ethernet, token ring, or other types of physical attachment for purposes of providing a communication link to support a local or wide area network, for example. In any event, in this manner, the computer system 300 may be coupled to a number of clients and/or servers via a conventional network infrastructure, such as a company's Intranet and/or the Internet, for example.

Job Processing

Figure 4:
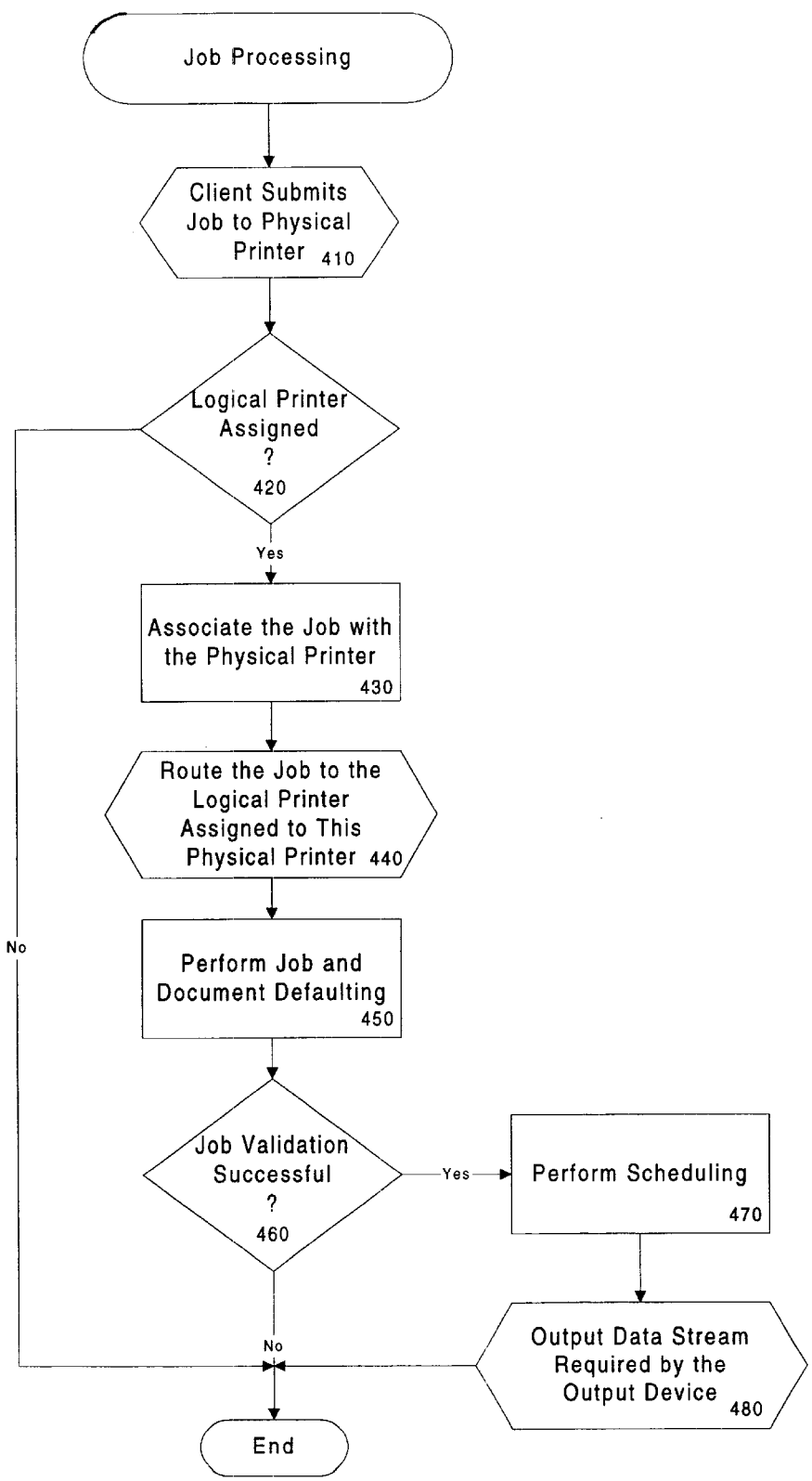
FIG. 4 is a flow diagram illustrating job processing according to one embodiment of the present invention.

FIG. 4 is a flow diagram illustrating job processing according to one embodiment of the present invention. Advantageously, as will be illustrated by this example, by providing the physical printers 260 with knowledge of a logical printer through which jobs may return to the physical printer, normal defaulting, validation, and scheduling may be preserved while providing the ability to submit jobs directly to physical printers.

At step 410, a print-client 215 submits a job to a physical printer. At step 420, the physical printer receives the job and makes a determination regarding whether or not a logical printer is assigned to the physical printer. While preferably a new attribute associated with the physical printer, e.g., "logical-printer-assigned," is used to identify a logical printer, if any, through which print jobs may flow to the physical printer, various other approaches may be employed to maintain the association of logical to physical printers. For example, the mapping of logical to physical printers may be stored in a table accessible to the physical printers. Alternatively, the associations may be maintained by the queues 250 and the physical printers may query their associated queue to determine whether or not a logical printer has been assigned. For the sake of efficiency and in order to maintain consistency with the DPA 10175 attribute model, according to the preferred embodiment, the physical printers 260 each include a logical-printer-assigned attribute that identifies the logical printer to which the physical printer is assigned. In any event, if it is determined that a logical printer is assigned to the physical printer, then job processing continues with step 430; otherwise job submission to this physical printer is not enabled and job processing is complete.

At step 430, an association is created between the job and the physical printer. According to one embodiment, the physical printer to which the job has been submitted may set an attribute in the job, e.g., "physical-printer-requested," to the name of the physical printer. Again, various other mechanisms for storing associations between jobs and physical printers may be employed. For example, a table-based approach may be used to maintain a mapping of jobs to physical printers. The purpose of the association is to ensure the job is output on the hardware output device associated with the physical printer. Therefore, the mechanism by which the association is accomplished is not an important as the fact that the association is, in fact, created. At any rate, after the association between the job and the physical printer is created, the job is routed to the logical printer assigned to the physical printer in step 440. The transfer of the job from the physical printer to the logical printer may be by way of the supervisor processes 230 and/or the spooler process 225, the job may be transferred directly from the physical printer to the logical printer, or other intermediate objects and/or processes may be employed. The precise mechanism by which the transfer is accomplished is not as important as the fact that the capability is provided to transfer jobs from the physical printers 260 to the logical printers 240, thereby maintaining functionality, such as defaulting, validation, and scheduling, submittors have come to expect.

At step 450, job and document defaulting is performed. For example, certain job attributes that have been left unspecified by the submitter may be assigned default values. Upon completing job and document defaulting, at step 450, job validation is performed and a decision is made based upon the success of the validation. In general, job validation involves determining whether or not a hardware output device on the network 280 can accommodate the job. Typically, this involves comparing attributes associated with the job to attribute values supported by the printer objects. For example, the job may first be validated against the logical printer and then against the requested physical printer. Generally, unless all of the job's attributes are supported by both the logical printer and the physical printer, the job is rejected. Therefore, successful validation ensures the compatibility between the print request and the target hardware output device. At any rate, if the validation is successful, job processing proceeds to step 470; otherwise job processing is terminated.

At step 470, the job is scheduled for output by transferring the job to a queue associated with the requested physical printer, i.e., the physical printer to which the job was submitted. When the physical printer becomes available, the queue transfers the job to the physical printer. The physical printer then causes the job to be printed on the hardware output device by outputting a data stream required by the hardware output device (step 480). After step 480, job processing is complete.

Figure 5A:
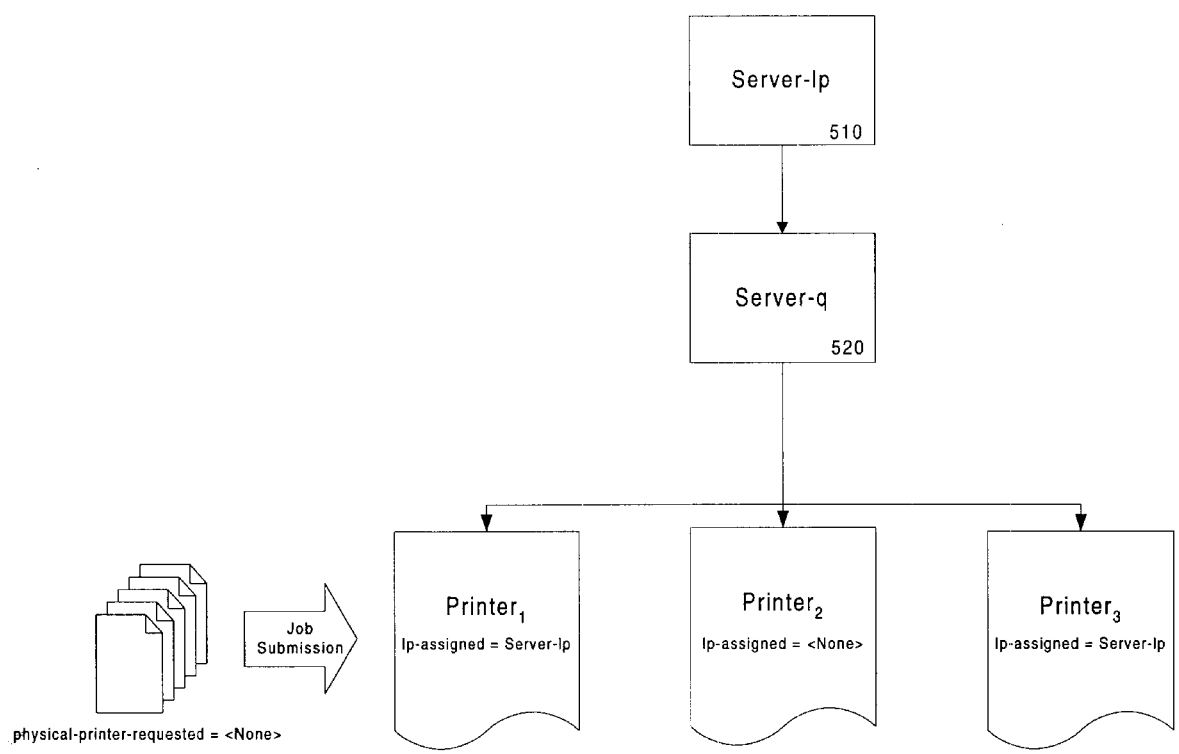
FIGS. 5A, 5B, and 5C conceptually illustrate job submission and processing according to one embodiment of the present invention.
Figure 5B:
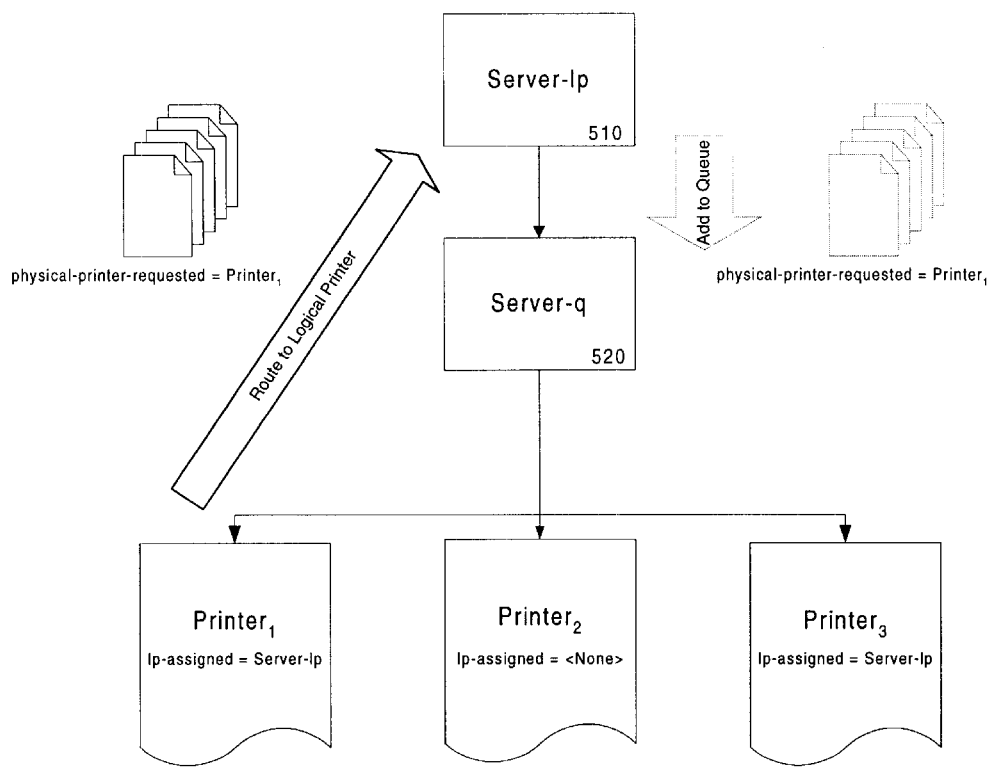
Figure 5C:
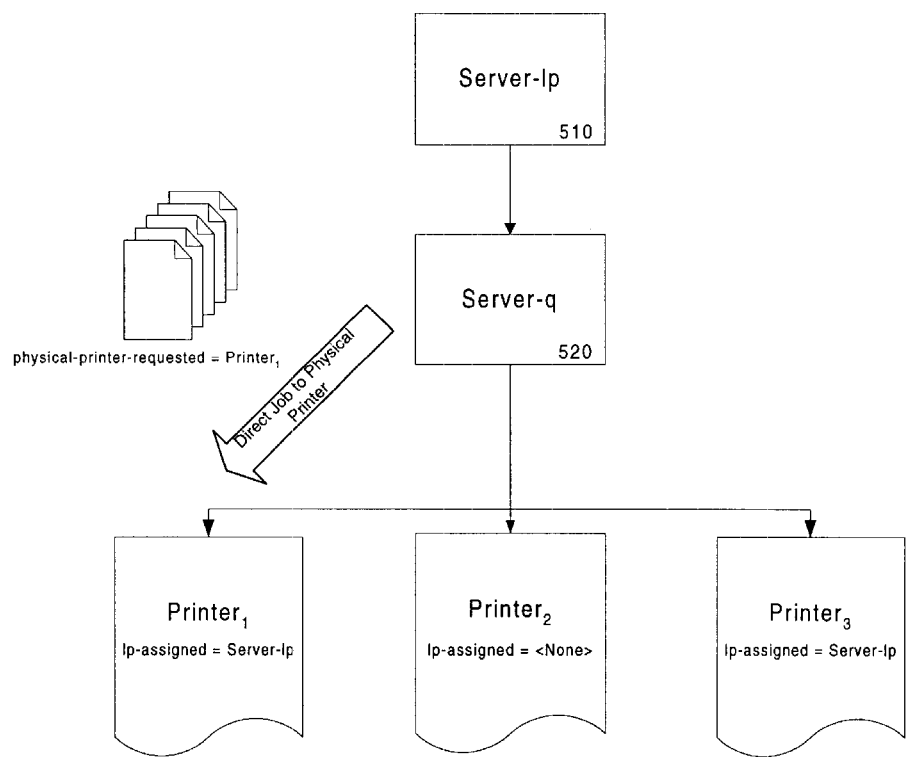

FIGS. 5A, 5B, and 5C conceptually illustrate job submission and processing according to one embodiment of the present invention. In the example illustrated by FIGS. 5A, 5B, and 5C, a logical printer 510, server-lp, is coupled to three physical printers, printer$_1$, printer$_2$, and printer$_3$ through a single queue 520, server-q. In this example, printer$_1$ includes an attribute "lp-assigned" that is set to the name of the logical printer, "server-lp," from which jobs flow to printer$_1$. The lp-assigned attribute of printer$_2$ has not been set. The lp-assigned attribute of printer$_3$ has been set to "server-lp." from which jobs flow to printer$_1$. Therefore, both printer$_1$ and printer$_3$ may receive and process directly submitted print jobs and printer$_2$ is incapable of processing directly submitted print jobs.

In FIG. 5A, a print job is submitted to printer$_1$ (step 410). As originally submitted, the job's physical-printer-requested attribute is not set. In FIG. 5B, printer$_1$ has associated the job with the physical printer (step 430), e.g., by setting the physical-printer-requested attribute of the print job to printer$_1$, and transfers the print job to the logical printer 510 (step 440). After job and document defaulting, if any, are performed (step 450), the logical printer 510 may perform validation (step 460) and subsequently schedules the job (step 470), e.g., by adding the job to the queue 520. In FIG. 5C, when the print job is at the front of the server-q 520 and printer$_1$ is available, the print job is transferred to printer$_1$ which causes the document associated with the job to be printed on the associated hard copy printer by outputting a data stream understood by the hard copy printer (step 480).

As described earlier, this configuration has several advantages. The system administrator's duties are simplified by allowing fewer printer objects to be created and managed. For example, in the structure depicted in FIGS. 5A, 5B, and 5C, only N+2 objects need to be created, where N represents the number of hardware output devices, rather than 3*N as required by the configuration depicted in FIG. 1. Also, jobs can be viewed and managed though the single queue 520 rather than separate queues for each hardware output device. Furthermore, by simply changing the submission target to server-lp, this structure allows the pooling of printer$_1$, printer$_2$, and printer$_3$ without necessitating reconfiguration of the printer objects as would be required in the structure depicted in FIG. 1.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing print jobs comprising the steps of:

receiving a print job at a physical printer, the physical printer representing capabilities of an associated output device;

creating an association between the print job and the physical printer; and routing the print job from the physical printer to a predetermined logical printer representing an abstract set of job and output device capabilities.

2. The method of claim 1, wherein the output device comprises a printer.

3. The method of claim 1, wherein the output device comprises a copier.

4. The method of claim 1, wherein the output device comprises a plotter.

5. The method of claim 1, wherein the output device comprises a facsimile machine.

6. The method of claim 1, wherein the output device comprises a microfilm/microfiche generator.

7. The method of claim 1, wherein the physical printer has an attribute that identifies a logical printer, if any, through which print jobs may flow to the physical printer and wherein the step of routing the print job from the physical printer to a predetermined logical printer comprises transferring the print job to the logical printer identified by the attribute of the physical printer.

8. The method of claim 1, wherein a queue associated with the physical printer has information indicative of a logical printer, if any, through which jobs may flow to the physical printer and wherein the step of routing the print job from the physical printer to a predetermined logical printer comprises the steps of:

the physical printer querying the queue for the information indicative of the logical printer; and the physical printer transferring the print job to the logical printer.

9. The method of claim 1, wherein a mapping is maintained which contains information indicative of a logical printer, if any, through which jobs may flow to the physical printer and wherein the step of routing the print job from the physical printer to a predetermined logical printer comprises the physical printer transferring the print job to the logical printer based upon the mapping.

10. The method of claim 1, wherein the print job includes an attribute that identifies one or more physical printers as candidates for printing the job, and wherein the step of creating an association between the print job and the physical printer comprises setting the attribute in the print job to a name of the physical printer.

11. The method of claim 1, further comprising the step of validating the print job by comparing one or more attribute values associated with the print job with attributes values supported by the predetermined logical printer and the physical printer.

12. The method of claim 11, further comprising the step of assigning values to one or more job attributes or document attributes that are unspecified, the values based upon information associated with the predetermined logical printer.

13. The method of claim 12, further comprising the step of transferring the print job to a queue for scheduling.

14. The method of claim 13, wherein the output device comprises a hard copy printer, and wherein the method further comprising the steps of:

receiving the print job at the physical printer; and preparing a document associated with the print job for output by creating a data stream supported by the hard copy printer.

15. A method of processing a print job comprising the steps of:

receiving a print job at a physical printer, the physical printer representing capabilities of an associated output device, the physical printer including an attribute that identifies a logical printer to which the physical printer is assigned, if any;

creating an association between the print job and the physical printer;

routing the print job to the logical printer identified by the attribute of the physical printer;

validating the print job; and transferring the print job to a queue for scheduling.

16. The method of claim 15, wherein the print job includes an attribute that identifies one or more physical printers as candidates for printing the job, and wherein the step of creating an association between the print job and the physical printer comprises setting the attribute in the print job to the name of the physical printer.

17. The method of claim 15, wherein the output device comprises a printer.

18. The method of claim 15, wherein the output device comprises a copier.

19. The method of claim 15, wherein the output device comprises a plotter.

20. The method of claim 15, wherein the output device comprises a facsimile machine.

21. The method of claim 15, wherein the output device comprises a microfilm/microfiche generator.

22. A print server comprising:

a plurality of physical printer objects each corresponding to an associated output device, each of the physical printer objects including an attribute that identifies a logical printer object, if any, through which print jobs may flow to the physical printer object, each of the physical printer objects are configured to create an association between print jobs submitted to the physical printer object and the physical printer object and configured to transfer the print jobs to the logical printer object identified by the attribute; and one or more logical printer objects coupled to the plurality of physical printer objects, the one or more logical printer objects configured to schedule the print jobs on the physical printer object with which the print jobs are associated.

23. The print server of claim 22, wherein the one or more logical printer objects are further configured to validate the print jobs by comparing one or more attribute values associated with the print jobs to attributes supported by one or more of the plurality of physical printers.

24. The print server of claim 23, wherein each of the print jobs include an attribute for identifying a physical printer of the plurality of physical printers as the desired physical printer for printing the jobs, and wherein creating the associations between the print jobs and the physical printer objects involves setting the attribute in the print job to a name of the physical printer object.

25. A machine-readable medium having stored thereon data representing sequences of instructions, said sequences of instructions which, when executed by a processor, cause said processor to perform the steps of:

receiving a print job at a physical printer, the physical printer representing capabilities of an associated output device;

creating an association between the print job and the physical printer; and routing the print job from the physical printer to a predetermined logical printer representing an abstract set of job and output device capabilities.

26. The machine-readable medium of claim 25, wherein the physical printer has an attribute that identifies a logical printer to which the physical printer is assigned, if any, and wherein the step of routing the print job from the physical printer to a predetermined logical printer comprises transferring the print job to the logical printer identified by the attribute of the physical printer.

27. The machine-readable medium of claim 25, wherein the print job includes an attribute that identifies one or more physical printers as candidates for printing the job, and wherein the step of creating an association between the print job and the physical printer comprises setting the attribute in the print job to a name of the physical printer.

28. The machine-readable medium of claim 25, wherein said sequences of instructions further cause said processor to perform the step of validating the print job by comparing one or more attribute values associated with the print job with attributes values supported by the predetermined logical printer and the physical printer.

29. The machine-readable medium of claim 25, wherein said sequences of instructions further cause said processor to perform the step of assigning values to one or more job attributes or document attributes that are unspecified, the values based upon information associated with the predetermined logical printer.

30. The machine-readable medium of claim 25, wherein said sequences of instructions further cause said processor to perform the step of transferring the print job to a queue for scheduling.

31. The machine-readable medium of claim 25, wherein the output device comprises a hard copy printer, and wherein said sequences of instructions further cause said processor to perform the steps of:

receiving the print job at the physical printer; and preparing a document associated with the print job for output by creating a data stream supported by the hard copy printer.

32. A machine-readable medium having stored thereon data representing sequences of instructions, said sequences of instructions which, when executed by a processor, cause said processor to perform the steps of:

receiving a print job at a physical printer, the physical printer representing capabilities of an associated output device, the physical printer including an attribute that identifies a logical printer, if any, through which print jobs may flow to the physical printer;

creating an association between the print job and the physical printer;

routing the print job to the logical printer identified by the attribute of the physical printer;

validating the print job; and transferring the print job to a queue for scheduling.

33. The machine-readable medium of claim 32, wherein the print job includes an attribute that identifies one or more physical printers as candidates for printing the job, and wherein the step of creating an association between the print job and the physical printer comprises setting the attribute in the print job to a name of the physical printer.

* * * * *